United States Patent Office 2,959,465
Patented Nov. 8, 1960

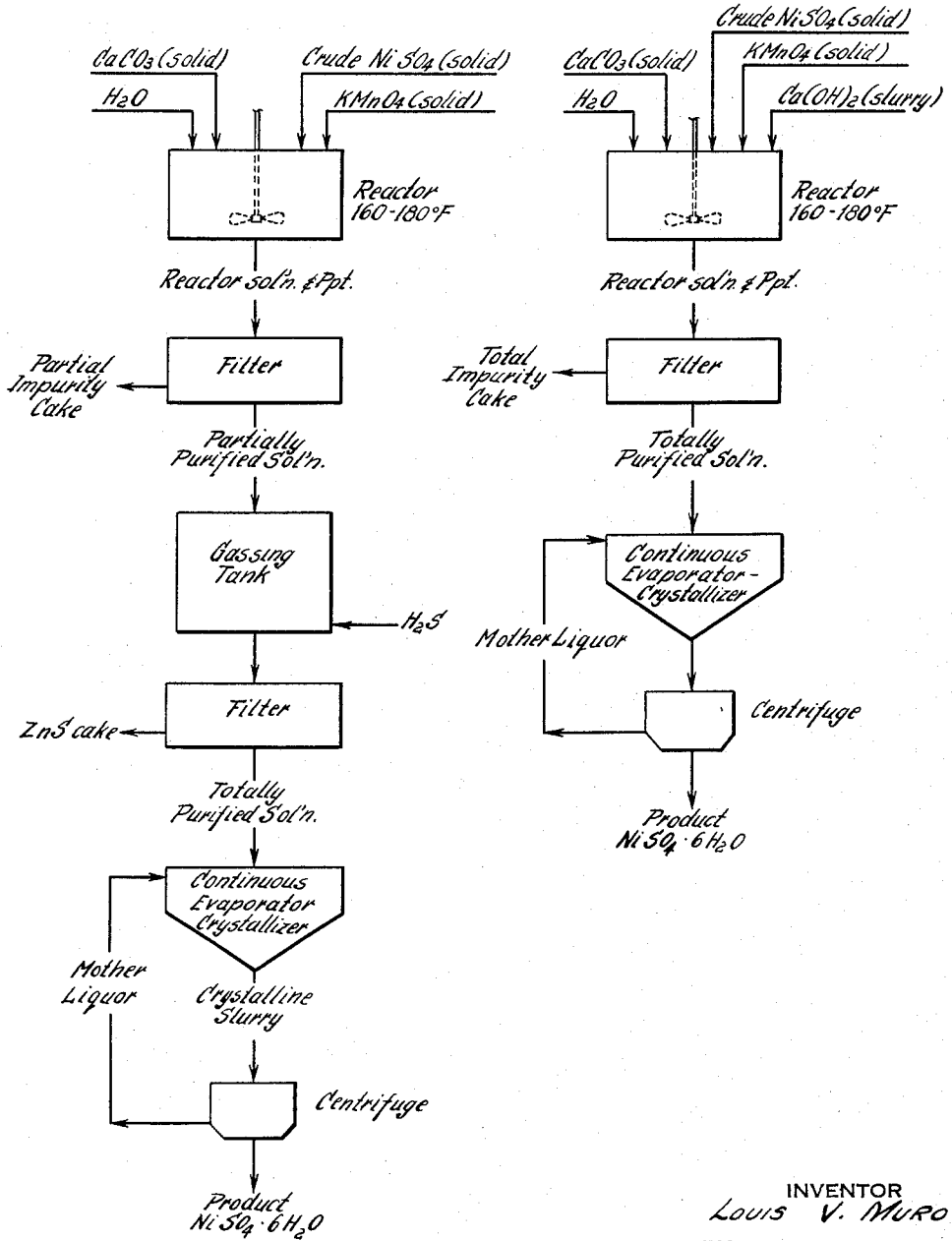

2,959,465

METHOD OF PURIFYING CRUDE NICKEL SULFATE

Louis V. Muro, Colonia, N.J., assignor to American Metal Climax, Inc., New York, N.Y., a corporation of New York Filed Oct. 7, 1959, Ser. No. 845,036

9 Claims. (Cl. 23—117)

This invention relates to an improved process for purifying crude nickel salts and relates more particularly to improvements in the purification of crude nickel sulfate obtained as a by-product of the electrolytic refining of copper. This application is a continuation-in-part of now abandoned application Serial No. 661,398, filed May 24, 1957.

Crude nickel sulfate such as is recovered as a by-product in electrolytic copper refining contains substantial amounts of iron, zinc, copper, and alkaline earth metals as impurities. These contaminants must be reduced to acceptable levels before the nickel sulfate can successfully be used in nickel plating operations.

In conventional methods of purifying this material, it is generally the practice to first dissolve the crude salt in water and subsequently treat the solution with a combination of calcium carbonate and oxidizing agents also usually admixed with water to precipitate copper, iron and some zinc, along with calcium sulfate which is formed by the neutralization of the free sulfuric acid usually associated with the crude material. Following filtration to remove the precipitated impurities, the filtrate which contains most of the nickel is gassed with hydrogen sulfide to precipitate the residual zinc as zinc sulfide which is then removed by a second filtration after which the filtrate is evaporated to enable the crystallization of purified nickel sulfate from the concentrated solution.

The initial step of dissolving the crude nickel salts in water followed by the addition of aqueous mixtures of calcium carbonate and other reagents required for precipitating a major portion of the impurities leads to the formation of unduly large volumes which require apparatus of large capacity particularly when the purification process is to be carried out on a commercial scale. Upon filtration of the mixture to separate the bulk impurities, the large volume of the resulting filtrate or process solution containing most of the nickel must thereafter be treated as by gassing with $H_2S$, filtered to remove residual zinc sulfide which is precipitated thereby and the filtrate must then be concentrated to enable the crystallization and recovery of the desired nickel sulfate in purified form. Due to the large volumes involved, the procedure is cumbersome and time consuming, an excessive amount of reagents is required, large amounts of water must be evaporated, etc., all of which factors contribute to making the method somewhat inefficient and rather costly. In addition to these disadvantages, the process solution containing the dissolved nickel following removal of the bulk impurities possesses a calcium to nickel ratio which is unfavorable in that condensation of the solution results in the simultaneous crystallization of excessive amounts of calcium sulfate which adversely affects the purity of the desired nickel sulfate product.

Accordingly, it is the principal object of this invention to provide a process for purifying crude nickel salts wherein the volume of the nickel-containing solution is appreciably reduced to facilitate the handling thereof whereby the process may be carried out in a more efficient and economical manner.

Another object of this invention is to provide a process for enabling the purification of crude nickel sulfate wherein a reduced number of steps are employed and wherein undesirable interference by crystallization of calcium sulfate during evaporation and crystallization of the purified nickel sulfate is substantially reduced.

These and other objects and advantages are realized by the present invention which broadly comprises a reversed addition sequence in preparing the initial mixture from which a process solution of greatly reduced volume and containing a much more favorable calcium to nickel ratio is obtained. It has now been found that the addition of substantially dry crude nickel salts to an aqueous slurry of calcium carbonate in amounts sufficient to lower the pH to a predetermined value generally ranging from 3.5 to 5.5 results in the provision of a process solution upon removal of the bulk impurities by filtration which is greatly enhanced with respect to its nickel content compared to a corresponding equivalent volume of such solution prepared in accordance with prior conventional practices. Thus, it becomes possible to process larger amounts of the material with equipment of a given capacity, the reduced volume advantage for comparable amounts of nickel making possible improved economy and other advantages. The novel approach herein described for making up the initial mixtures leading to a more favorable process solution for subsequently handling has the further advantage of a comparatively low calcium to nickel ratio which minimizes the interfering crystallization of excess calcium sulfate previously mentioned. It has been further found that the lower Ca:Ni ratio lends itself to the use of calcium hydroxide in lieu of gassing with hydrogen sulfide to effect the precipitation of residual zinc. Even with the additional calcium incorporated thereby into the mixture, the final crystallization of the purified nickel sulfate may be carried out in the absence of interference by excessive calcium sulfate co-crystallization or precipitation.

The improved process and specific advantages which are obtained by the use of my invention will become more readily apparent from the following detailed description considered together with the flow sheets shown in the accompanying drawing in which:

Fig. 1 depicts a process for the purification of crude nickel salt in which the final zinc elimination is carried out in a more or less conventional manner but utilizing the process solution prepared in accordance with this invention; and Fig. 2 shows an alternative processing scheme utilizing the improved process solution of this invention in conjunction with the use of calcium hydroxide as a precipitant for zinc elimination.

The anhydrous crude nickel sulfate salts obtained as a by-product of the electro-refining of copper usually contain from 22–23% nickel, from 2–3% free sulfuric acid, and from 15–20% mechanical moisture as well as impurities consisting of zinc, iron, copper, calcium, and magnesium which are present in a range from .1–.6% each. In the preferred embodiment of this invention, a batch of impure or crude nickel sulfate is added to a hot (160–180° F.) aqueous slurry of calcium carbonate which is prepared in a reactor provided with agitating means. This slurry contains about 6–7 parts by weight of water for each part of nickel in the crude salt to be treated and about 5–6 parts of calcium carbonate for each part by weight of free acid contained in the crude salt. More simply stated, it has been found that an aqueous slurry of calcium carbonate containing from 8–10%, and preferably about 9% calcium carbonate is effective for dissolving the general run of crude nickel salts of the type described for the purpose of producing a much more concentrated process solution with reference to dissolved nickel while providing a material which is still amendable to pumping and convenient handling.

The amount of crude salt added to the calcium carbonate slurry is controlled by the pH of the mixture in the reactor. Where the subsequent zinc purification is to be carried out by the $H_2S$ method (Fig. 1), the addition of crude salt to the calcium carbonate slurry described above is made until a pH value generally between 3.5 and 5.5 and preferably between 4.7 and 5.2 and optimally of about 5 is attained in the course of which precipitation of copper, ferric iron and some zinc occurs. The residual ferrous iron may then be precipitated in the usual manner by the addition of a suitable amount of an oxidizing agent such as potassium permanganate which may be added as a solid thereby avoiding any further appreciable increase in volume. After agitating the mixture, it is filtered while still warm using, for example, a plate and frame filter press and the filtrate is then allowed to cool to room temperature. The specific gravity of the filtrate at the reaction temperature maintained during the mixing is generally between 40 and 42 degrees Beaumé (° Bé.) and analysis of the filtrate or process solution at this point indicates a nickel content of 135 to 145 grams per liter of solution. Solutions obtained by conventional processes at this point contain, by comparison, only about 65 to 100 grams of nickel per liter of solution and possess a specific gravity of only 20 to 30° Bé. It will thus become readily apparent that the present invention enables the processing of approximately 50 to 100% more nickel as nickel sulfate under conditions involving comparable volume considerations.

Residual zinc in the process solution is precipitated preferably as zinc sulfide by gassing the cooled process solution preferably at about room temperature with hydrogen sulfide until a pH of 3 or thereabouts is reached. At this point, the precipitate is removed by filtration and the clarified solution is then condensed to effect the crystallization of sufficiently pure $NiSO_4 \cdot 6H_2O$. This latter step may be conveniently carried out on a large scale by the use of a continuous evaporator-crystallizer such as a Struther-Wells unit operating at 90–100° F. to produce a mother liquor of about 48° Bé. from which the crystals are recovered by centrifuging as shown in Fig. 1. A yield of 80% or even higher of the nickel charged is obtained as crystallized product consisting essentially of $NiSO_4 \cdot 6H_2O$ containing calcium and other impurities below the limits specified as acceptable for use in nickel plating applications. It is pointed out that the term "nickel sulfate" as used herein with reference to the purified product includes the hydrate thereof as, for example, the hexahydrate designated above.

The overall yield may be increased up to 95% or even higher by reworking the initial filter cake containing the bulk impurities by repulping the same in hot $H_2SO_4$ (15% solution) and recovering the nickel sulfate formed thereby.

With respect to the condensation step, it will be apparent that the extent of evaporation required is drastically reduced due to the lesser volumes having increased nickel concentration maintained throughout the entire process. The savings in apparatus costs, time and labor realized thereby are obvious. In addition to these advantages, the reversed mixing sequence specified herein resulting in an appreciably reduced calcium to nickel ratio in the process solution enables the direct crystallization of the desired product therefrom without first treating the process solution for the separate removal of calcium sulfate by skimming or by the use of one or more additional filtration steps to avoid excessive calcium contamination. The lower calcium to nickel ratio characterizing the process solutions obtained in accordance with the present invention enables the direct crystallization of the final product, the amount of calcium co-crystallized therewith being within the acceptable limit of calcium impurities specified for the purified nickel sulfate product intended for use in plating applications.

If desired, calcium hydroxide may be used in place of the gassing with $H_2S$ step to precipitate the residual zinc. This modified procedure consists of adding to an aqueous slurry containing from 8 to 10 and preferably about 9% by weight of calcium carbonate preferably warmed to between 160 and 180° F. or thereabouts, sufficient crude nickel sulfate to lower the pH of the reactor contents to generally between 3.5 and 5.5. In this instance, however, the use of a pH range between 3.8 and 4.3 is conducive to improved results with best results being obtained at a pH of about 4. An oxidant is added as before to precipitate ferrous iron and after allowing usually a brief period for the reactions involved to proceed to completion, sufficient calcium hydroxide preferably in the form of an aqueous slurry (about 30 to 40% $Ca(OH)_2$ by weight) is then added to the mixture to raise the pH to at least 5.5 or slightly higher to precipitate any residual zinc as the hydroxide. After the addition of $Ca(OH)_2$ is completed, the continuously stirred mixture kept at approximately the specified reaction temperature for an additional 15 to 45 minutes is then filtered or centrifuged while still hot to separate the precipitated impurities. The resulting filtrate or process solution may then be processed as in the previously described procedure for the crystallization and removal of nickel sulfate hexahydrate.

Although the yield of the purified product recoverable from the process solution obtained in the modified process just described is generally less than the yields obtained from the process solutions treated with $H_2S$, the filter cake may be reworked as in the previous case to provide overall yields in excess of about 95%. The process utilizing the $Ca(OH)_2$ addition step has the advantage of eliminating a rather objectionable $H_2S$ gassing step and the further advantage of enabling the entire processing steps excepting the condensation and crystallization steps to be carried out in a single unit whereas the gassing step requires the transfer of the material from the mixing apparatus to special equipment. As in the previous case, the calcium to nickel ratio of the condensed solution is again such that the amount of calcium which co-crystallizes with the purified nickel sulfate is not enough to be objectionable.

The invention is further illustrated by the following specific examples:

*Example I*

Following the flow sheet shown in Fig. 1, 720 lbs. of dry calcium carbonate are slurried in 900 gallons of water of which 300 gallons are obtained in the form of recycle wash water from the first filtration. The slurry is heated to 170° F. and crude nickel sulfate is added with agitation to pH 5.0. Approximately 5,000 lbs. of crude salt of the nature heretofore described are required, the addition being made over a period of about 1¼ hours after which 18 lbs. of dry potassium permanganate are then gradually added to oxidize the iron to the insoluble ferric form. Stirring is continued for about 15 minutes longer following the oxidant addition after which the mixture is filtered while still hot and the cake washed with 300 gallons of water. The resulting wash water is recycled to the calcium carbonate slurry preparation. Approximately 770 gallons of filtrate are obtained having a gravity of 42° Bé. and containing about 144 grams per liter of nickel. The filter cake weighing 2160 lbs. and containing about 210 lbs. of nickel is set aside for future retreatment. The filtrate is allowed to cool to approximately room temperature after which it is gassed with $H_2S$ to a pH of 3.0 about 35 lbs. of $H_2S$ being required for the purpose. The precipitate formed thereby consisting primarily of zinc sulfide and amounting to approximately 20 lbs. is separated by filtration. The purified solution containing about 144 grams per liter of nickel is then processed preferably as previously described yielding about 4180 lbs. of $NiSO_4 \cdot 6H_2O$ of sufficient purity for use in nickel plating operations.

*Example II*

In carrying out the modified process shown in Fig. 2, about 700 lbs. of dry calcium carbonate are slurried in 850 gallons of water of which 350 gallons are recycled from the filter cake wash. The slurry is heated to 170° F. and substantially dry crude nickel sulfate is added in a gradual manner while continuously agitating the mixture. The addition is continued until a pH of 4.0 is reached requiring about 5,000 lbs. of crude nickel salt and about 1¼ hours to complete the addition. Agitation is continued while 18 lbs. of potassium permanganate is further added and, after stirring for about 15 minutes, the residual zinc is precipitated by the addition of sufficient 37% calcium hydroxide slurry to raise the pH of the reactor contents to about 5.5. The mixture is maintained at about 170° F. continuing the agitation for an additional ¼ hour and is then filtered hot yielding about 620 gallons of purified solution having a gravity of approximately 40° Bé. and containing about 140 grams per liter of nickel. This solution, cycled through a continuous evaporator-crystallizer as previously described yields a total of 3120 lbs. of $NiSO_4 \cdot 6H_2O$ of acceptable purity.

*Example III*

A sample of process solution obtained in the process carried out in accordance with this invention was analyzed to determined the ratio of calcium to nickel solubilized therein. It was found that such a solution containing 144 grams per liter of nickel and having a specific gravity of 42° Bé. (170° F.) contained .86 gram per liter of calcium which is equivalent to a Ca:Ni ratio of 1 to 167.5. By comparison, the corresponding filtered process solutions of nickel sulfate derived from the prior practices usually contain only about 70 grams per liter of nickel and have a specific gravity of about 25° Bé. at 170° F. contain calcium to the extent of .68 gram per liter, equivalent to a Ca:Ni ratio of 1 to 103. This difference in the respective calcium to nickel ratios, upon condensation of the solutions to effect crystallization is manifested by correspondingly less calcium contamination of the final product in favor of the solutions obtained in accordance with the present invention. With the solutions of comparatively higher calcium content, the calcium sulfate crystallized therefrom is excessive and special steps must be taken accordingly to prevent undue contamination of the desired product.

While in the foregoing specification a number of specific embodiments have been set forth and various specific details have been given, it will be apparent to those skilled in the art that many of the details can be varied widely without departing from the basic concept of the invention.

I claim:
1. In a process for the treatment of crude nickel sulfate obtained from electro-refining of copper, said crude nickel sulfate containing impurities of copper, zinc, iron, calcium, magnesium and compounds thereof for the recovery of nickel sulfate substantially freed of said contaminants, the steps comprising providing an aqueous slurry of calcium carbonate, adding to said slurry while agitating the same sufficient crude nickel sulfate in substantially dry form to lower the pH of the resulting mixture between 3.5 and 5.5 thereby precipitating at least some of the contaminant substances in the mixture, further adding an oxidant for iron to precipitate ferrous iron present therein, separating the precipitated material to provide a clarified solution and thereafter crystallizing the nickel sulfate from said clarified solution.

2. The process of claim 1 wherein the aqueous slurry contains about 8 to 10% by weight of calcium carbonate.

3. The process of claim 1 wherein the dry crude nickel sulfate contains up to 20% by weight of entrained moisture.

4. The process of claim 1 wherein the aqueous slurry is maintained at a temperature between 160 and 180° F. during the addition of the crude nickel sulfate.

5. The process of claim 1 wherein the amount of crude nickel sulfate added to the aqueous slurry is sufficient to lower the pH thereof to between 4.7 and 5.2 including the further steps of gassing said clarified solution with hydrogen sulfide and removing the zinc sulfide precipitated thereby prior to crystallizing the purified nickel sulfate from said solution.

6. The process of claim 5 wherein the gassing of the filtrate with hydrogen sulfide is continued until a pH of about 3 is reached.

7. In a process for the treatment of crude nickel sulfate obtained from electro-refining of copper, said crude nickel sulfate containing impurities of copper, zinc, iron, calcium, magnesium and compounds thereof for the recovery of nickel sulfate substantially freed of said contaiminants, the steps comprising heating an aqueous slurry containing generally between 8 and 10% by weight of calcium carbonate to between 160 and 180° F., adding said crude nickel sulfate in substantially dry form thereto in an amount sufficient to provide a pH between 3.5 and 5.5 of the mixture while agitating said mixture thereby precipitating at least some of the contaminant materials, adding an oxidant for iron to precipitate residual ferrous iron, filtering the mixture while warm to remove the precipitated material and thereafter crystallizing nickel sulfate from the clarified solution obtained thereby.

8. The process of claim 7 wherein the amount of crude nickel sulfate added to the aqueous slurry is sufficient to lower the pH thereof to between 4.7 and 5.2 including the further steps of gassing the clarified solution with hydrogen sulfide to a pH of about 3 after cooling the same whereby residual zinc is precipitated and removing the resulting precipitate from said solution prior to recovering nickel sulfate therefrom.

9. The process of claim 7 wherein the amount of crude nickel sulfate added to the aqueous slurry is sufficient to provide a pH between 3.8 and 4.3 and including the further step of adding calcium hydroxide thereto to raise the pH to a value of about 5.5 prior to the filtering step for removal of the precipitated material.

References Cited in the file of this patent

UNITED STATES PATENTS

| | | |
|---|---|---|
| 718,554 | Waring | Jan. 13, 1903 |
| 1,193,734 | Sulman et al. | Aug. 8, 1916 |
| 1,276,130 | Smith | Aug. 20, 1918 |
| 1,533,741 | Kichline et al. | Apr. 14, 1925 |
| 2,356,183 | Shepard et al. | Aug. 22, 1944 |